US011881752B2

(12) United States Patent
Shen et al.

(10) Patent No.: US 11,881,752 B2
(45) Date of Patent: Jan. 23, 2024

(54) DIRECT-DRIVE TYPE ANNULAR FLEXIBLE TRANSPORTATION SYSTEM AND COLLABORATIVE CONTROL METHOD THEREOF

(71) Applicants: ZHEJIANG UNIVERSITY, Zhejiang (CN); ZHEJIANG UNIVERSITY ADVANCED ELECTRICAL EQUIPMENT INNOVATION CENTER, Zhejiang (CN)

(72) Inventors: Yiming Shen, Zhejiang (CN); Yanfei Cao, Zhejiang (CN); Yan Yan, Zhejiang (CN); Tingna Shi, Zhejiang (CN); Changliang Xia, Zhejiang (CN)

(73) Assignees: ZHEJIANG UNIVERSITY, Zhejiang (CN); ZHEJIANG UNIVERSITY ADVANCED ELECTRICAL EQUIPMENT INNOVATION CENTER, Zhejiang (CN)

( * ) Notice: Subject to any disclaimer, the term of this patent is extended or adjusted under 35 U.S.C. 154(b) by 0 days.

(21) Appl. No.: 18/012,984

(22) PCT Filed: Jan. 4, 2022

(86) PCT No.: PCT/CN2022/070020
§ 371 (c)(1),
(2) Date: Dec. 27, 2022

(87) PCT Pub. No.: WO2023/035517
PCT Pub. Date: Mar. 16, 2023

(65) Prior Publication Data
US 2023/0275499 A1  Aug. 31, 2023

(30) Foreign Application Priority Data

Sep. 13, 2021  (CN) .......................... 202111068847.X

(51) Int. Cl.
H02K 41/03  (2006.01)
H02P 25/064  (2016.01)
(Continued)

(52) U.S. Cl.
CPC ........... *H02K 41/031* (2013.01); *B65G 54/02* (2013.01); *H02K 11/215* (2016.01); *H02P 25/064* (2016.02)

(58) Field of Classification Search
CPC ...... H02K 41/031; H02K 41/03; H02K 41/02; H02K 11/215; H02K 11/21; H02K 11/20;
(Continued)

(56) References Cited

U.S. PATENT DOCUMENTS 6,206,170 B1 * 3/2001 Kissel .................. B65G 11/023
198/810.01
6,876,896 B1 * 4/2005 Ortiz .................... B29C 65/7867
318/135

(Continued)

FOREIGN PATENT DOCUMENTS

CN 101355289 11/2010
CN 101552535 6/2011
(Continued)

OTHER PUBLICATIONS

"International Search Report (Form PCT/ISA/210) of PCT/CN2022/070020," dated Jun. 8, 2022, pp. 1-4.
(Continued)

Primary Examiner — Michael Andrews
(74) Attorney, Agent, or Firm — JCIPRNET

(57) ABSTRACT

A direct-drive type annular flexible transportation system and a collaborative control method thereof are provided. The direct-drive type annular flexible transportation system includes an annular base, a primary excitation type linear motor, an power supplying module, a power driving module, a position detection module, and a wireless communication module. The primary excitation type linear motor includes a long stator and a plurality of movers. The long stator is formed by connection of stator iron cores presenting a (Continued)

multi-segment cogging structure and is installed on the annular base. Each of the movers includes a short primary, a power driving module, a position detection module, and a wireless communication module. The short primary is formed by an asymmetrically-structured permanent magnet array, an armature winding, and a primary iron core.

9 Claims, 10 Drawing Sheets

(51) Int. Cl.
*H02K 11/215* (2016.01)
*B65G 54/02* (2006.01)
(58) Field of Classification Search
CPC ........ H02P 25/064; H02P 25/06; H02P 21/06; H02P 21/12; H02P 2203/01; B65G 54/02
USPC ........................................................ 310/179
See application file for complete search history.

(56) References Cited

U.S. PATENT DOCUMENTS

| | | | |
|---|---|---|---|
| 8,996,161 | B2 | 3/2015 | Wernersbach et al. |
| 10,112,777 | B2 | 10/2018 | King et al. |
| 10,181,780 | B2 | 1/2019 | Achterberg et al. |
| 10,407,246 | B2 | 9/2019 | Reinthaler |
| 10,773,847 | B2 | 9/2020 | Bellante et al. |
| 2013/0035784 | A1* | 2/2013 | Wernersbach ........ B60L 15/005 700/230 |
| 2019/0185276 | A1* | 6/2019 | Wernersbach .......... B60L 13/04 |

FOREIGN PATENT DOCUMENTS

| | | |
|---|---|---|
| CN | 108336885 | 7/2018 |
| CN | 110572003 | 12/2019 |
| CN | 108155775 | 5/2020 |
| CN | 212543626 | 2/2021 |
| CN | 113734720 | 12/2021 |
| CN | 113783396 | 12/2021 |
| EP | 3045399 | 6/2017 |
| JP | 2009120318 | 6/2009 |
| WO | 9627544 | 9/1996 |
| WO | 2015028212 | 3/2015 |
| WO | 2019007198 | 1/2019 |

OTHER PUBLICATIONS

"Written Opinion of the International Searching Authority (Form PCT/ISA/237) of PCT/CN2022/070020," dated Jun. 8, 2022, pp. 1-6.

* cited by examiner

DIRECT-DRIVE TYPE ANNULAR FLEXIBLE TRANSPORTATION SYSTEM AND COLLABORATIVE CONTROL METHOD THEREOF

CROSS-REFERENCE TO RELATED APPLICATION

This application is a 371 of international application of PCT application serial no. PCT/CN2022/070020, filed on Jan. 4, 2022, which claims the priority benefit of China application no. 202111068847.X, filed on Sep. 13, 2021. The entirety of each of the above mentioned patent applications is hereby incorporated by reference herein and made a part of this specification.

TECHNICAL FIELD

The disclosure belongs to a flexible transportation system and a method in the technical field of flexible transportation systems, and in particularly, relates to a direct-drive type annular flexible transportation system and a collaborative control method thereof.

DESCRIPTION OF RELATED ART

As the development of manufacturing technology moves towards precision, intelligence, and flexibility, the demand for flexible transportation systems in industrial applications such as long-haul automated production lines and packaging and transport logistics lines is increasing. In the traditional transportation system, the linear transmission is usually achieved by using a rotating motor together with mechanical components such as chains and belts. The transmission efficiency is not high and the reliability and control precision are low, and the basis for flexibility and intelligence is not provided. In recent years, in order to meet the requirements of precision, intelligence, and flexibility in manufacturing technology, flexible transportation systems directly driven by permanent magnet linear motors have been researched and applied. Permanent magnet linear motors combine the advantages of permanent magnet motors and linear motors. Electrical energy may be directly converted into mechanical energy for linear motion without the need for intermediate mechanical transmission parts. Significant advantages such as high thrust density, high speed, high precision, and high efficiency are provided, and the demand for flexible transportation systems may thus be well satisfied.

The working principle of a traditional permanent magnet linear motor is provided as follows: when the armature winding is fed with the alternating current, an armature magnetic field is generated in the air gap. At the same time, the permanent magnet poles generate an excitation magnetic field in the air gap. The armature magnetic field and the permanent magnet excitation magnetic field together constitute an air-gap magnetic field. When the motor starts, the magnetic pole is dragged, and the armature traveling wave magnetic field and the permanent magnet excitation magnetic field are relatively static. Therefore, the current in the armature winding generates electromagnetic thrust under the action of the air gap magnetic field. If the armature is fixed, the magnetic pole is pulled in to make linear movement synchronously under the action of thrust; otherwise, the armature is pulled in to make linear movement synchronously.

Due to the long moving distance (usually tens of meters to hundreds of meters), a major restriction on the popularization and application of the flexible transportation system directly driven by the traditional permanent magnet linear motor is the costs. When the moving armature structure is used, the permanent magnets are used as long stators, which need to be laid in the entire range of movement, and the number of permanent magnets is large. When the moving magnetic pole structure is used, the armature windings and iron cores are used as long stators and need to be laid over the entire range of movement. Further, the armature winding needs to be powered by multiple inverters in parallel, and the control is complicated. Therefore, regardless of whether a moving armature structure or a moving magnetic pole structure is used, the overall costs are high.

At present, some patents, such as WO1996027544A1 (1996), U.S. Pat. No. 8,996,161B2 (2015), WO2015028212A1 (2015), EP3045399B1 (2017), U.S. Ser. No. 10/112,777B2 (2018), U.S. Ser. No. 10/181,780B2 (2019), U.S. Ser. No. 10/407,246B2 (2019), WO2019007198A1 (2019), U.S. Ser. No. 10/773,847B2 (2020), etc., have proposed the use of a flexible transportation system directly driven by a traditional permanent magnet linear motor. In these patents, moving magnetic pole structures, armature windings, and electric iron cores are used as conventional permanent magnet linear motors with long stators. In order to reduce the costs of the abovementioned flexible transportation system directly driven by a traditional permanent magnet linear motor, the disclosure provides a flexible transportation system directly driven by a primary excitation type permanent magnet linear motor. Both the permanent magnet and the armature are placed on one side of the armature as a short mover, while the secondary is only formed by a laminated iron core and acts as a long stator.

The existing primary excitation type permanent magnet linear motors mainly are divided into the following two types:

1. Switching Flux Linkage Type Permanent Magnet Linear Motors

For instance, in a switching flux linkage type permanent magnet linear motor proposed by Chinese patents CN101355289B and CN108155775B, the topology structure clamps the permanent magnet in the middle position of the armature iron core teeth. Due to the small number of permanent magnets required and the short armature length, costs can be reduced in long-haul applications, but new problems also arise: (1) the armature iron core is formed by multiple discrete components, which is difficult to process and install, (2) the slot area and the permanent magnet are mutually restricted, and the thrust density is limited, and (3) the permanent magnet is surrounded by the armature winding, and the heat dissipation conditions are poor.

2. Magnetic Flux Reversal Type Permanent Magnet Linear Motors

For instance, in a magnetic flux reversal type permanent magnet linear motor proposed by Chinese patent CN101552535B, the topology structure places the permanent magnet on the surface of the armature iron core teeth close to the air gap. Due to the small number of permanent magnets required and the short armature length, costs can be reduced in long-haul applications, but new problems also arise: because the magnetic circuits are connected in series, the armature magnetic circuit needs to pass through the permanent magnet, so that the equivalent air gap of the armature magnetic circuit becomes larger, and the thrust density is limited.

The above two types of primary excitation type permanent magnet linear motors are symmetrical excitation structures. That is, the excitation magnetic fields generated by the permanent magnets of the two polarities are symmetrical with each other. Therefore, after the fast Fourier transform, only the fundamental wave and the odd-numbered harmonic magnetomotive force components exist, but the even-numbered harmonic magnetomotive force components do not exist. For the primary excitation type permanent magnet linear motor relying on the effective harmonic magnetic field to generate thrust, only relying on the fundamental wave and the odd-numbered harmonic magnetomotive force limits the further improvement of the thrust density of the motor.

SUMMARY

In view of the high costs of the existing flexible transportation system and the limited thrust density of the existing primary excitation type permanent magnet linear motor, the disclosure provides a flexible transportation system directly driven by an asymmetric multi-harmonic primary excitation type permanent magnet linear motor, in which by constructing the asymmetric excitation structure of the permanent magnet, the harmonic magnetomotive force with twice the pole pair number of higher amplitude is generated under the same number of permanent magnets, and the thrust density of the primary excitation type permanent magnet linear motor is effectively improved in this way. Further, in the disclosure, the long stator is only formed by laminated iron cores, the structure is simple and the costs are low, the movers can operate completely independently, and flexible transportation is thereby achieved.

The technical solutions of the disclosure are provided as follows.

1. A direct-drive type annular flexible transportation system is provided.

The system includes an annular base and a primary excitation type linear motor. The primary excitation type linear motor is installed on an annular side surface of the annular base. The primary excitation type linear motor includes a long stator and a plurality of movers. The movers operate independently of one another without electromagnetic coupling. The movers are attached onto the long stator by magnetic attraction, and air gaps are provided between the movers and the long stator. The long stator is fixedly connected to the annular base and is formed by seamless connection of stator iron cores presenting a multi-segment cogging structure arranged along the annular side surface of the annular base. Inner surfaces of the stator iron cores are fixed on the annular side surface of the annular base, and outer surfaces of the stator iron cores are provided with slots in an annular direction of the annular base. Each mover includes a short primary and roller guide rail assemblies on both sides, the short primary and the roller guide rail assemblies are fixedly connected together by brackets. The short primary is located outside the long stator. An air gap is provided between the short primary and the long stator. Both sides of the short primary are provided with the roller guide rail assemblies. Each roller guide rail assembly includes a roller and a guide rail. The guide rail is laid in the annular direction of the annular base, parallel to an arrangement direction of the long stator, and fixedly connected to the annular side surface of the annular base. The roller is connected to the guide rail and moves along the guide rail. In this way, the mover is fixed onto the guide rail through the roller and moves on the guide rail through the roller.

An air gap is kept between the short primary and the long stator under the interconnected support of the roller and the guide rail in the roller guide rail assembly.

The stator iron cores are divided into linear segments arranged on a plane surface of the annular side surface of the annular base and arc segments arranged on an arc surface of the annular side surface of the annular base. The arc inner diameter of the stator iron cores of the arc segments is the same as the outer diameter of the arc segments on the annular side surface of the annular base.

The short primary includes an asymmetrically-structured permanent magnet array, an armature winding, and a primary iron core. The primary iron core is provided with semi-closed slots on the side facing the long stator. A plurality of semi-closed slots are provided at intervals in the arrangement direction parallel to the long stator. Armature teeth are formed between adjacent semi-closed slots, and each armature tooth is wound with a coil as an armature winding. That is, a coil is wound between two adjacent semi-closed slots where the armature teeth are located.

The permanent magnet array is formed by permanent magnet units closely arranged side by side and is attached to a surface of armature teeth of the primary iron core. Each permanent magnet unit is composed of a permanent magnet A and a permanent magnet B arranged side by side in a fixed order in any single direction parallel to the long stator. The permanent magnet A and the permanent magnet B have opposite polarities, and the width of the permanent magnet B in the arrangement direction of the long stator is greater than the width of the permanent magnet A in the arrangement direction of the long stator, forming asymmetry. One permanent magnet B is arranged at an opening of each semi-closed slot, and one permanent magnet A is arranged on an outer end surface of the armature tooth of each semi-closed slot.

The magnetic pole directions of the permanent magnet A and the permanent magnet B are both in the depth direction of the slot and perpendicular to the moving direction of the mover.

The primary iron core uses a laminated iron core. A lamination direction of the laminated iron core is perpendicular to the moving direction of the movers and parallel to an installation surface of the stator iron cores of the long stator.

The number of the permanent magnet units is the same as the number of teeth on the primary iron core, and the number of teeth on the stator iron core of the long stator is set to $(kN_{ph}+2N_{ph})\pm1$ within the length of a single mover, where $kN_{ph}$ represents the number of teeth on the primary iron core, k represents the slot number coefficient, and $N_{ph}$ is the phase number of the permanent magnet linear motor.

The primary excitation type linear motor further includes an power supplying module. The power supplying module is mainly formed by an power supplying unit and an power receiving unit, and the power supplying unit and the power receiving unit are respectively installed on the annular base and each mover. The power supplying unit is formed by two U-shaped sliding conductor lines. Each sliding conductor line is arranged in the annular direction of the annular base, parallel to the arrangement direction of the long stator, and fixedly connected to the annular side surface of the annular base. The two sliding conductor lines are arranged side by side on both sides of the long stator and form a positive power wire and a negative power wire, and end portions thereof are connected to an external power supply source. The power receiving unit is formed by two current collectors including carbon brushes, and the two current collectors are slidably connected to the two sliding conductor lines. The current collectors, the short primary, and the roller guide rail assemblies are held together by brackets. In this way, the power supplying unit and the power receiving unit are connected by sliding contact, and the electric energy is transmitted to the mover in real time.

Each current collector has elasticity, which ensures that the mover is reliably connected to the sliding conductor line when the mover moves along the annular base, and the electric energy is reliably transmitted to the mover in real time.

The primary excitation type linear motor further includes a position detection module. The position detection module is connected to the power receiving unit. The position detection module includes a passive magnetic grid ruler laid on the long stator and a signal readhead integrated in the mover. The passive magnetic grid ruler is arranged in the annular direction of the annular base, parallel to the arrangement direction of the long stator, and fixedly connected to the annular side surface of the annular base. The signal readhead is fixedly installed together with the movers. Specifically, the signal readhead, current collectors, short primary, and roller guide assemblies are held together by brackets. The signal readhead is located on the side of the passive magnetic grid ruler, and the signal readhead is matched with the passive magnetic grid ruler for position detection.

The position detection module detects the relative movement position of each mover unit on the annular base in real time and transmits the position signal to a power driving module.

The primary excitation type linear motor further includes a power driving module and a wireless communication module, and the power driving module, the wireless communication module, and the mover are fixedly installed together. Specifically, the power driving module, wireless communication module, signal readhead, current collector, short primary, roller guide rail assembly are fixed together by brackets. The power driving module obtains electrical energy from the power receiving unit and outputs three-phase alternating current to the armature winding of the short primary in each mover to drive the mover to move. The position detection module is connected to a master computer through the wireless communication module, and the wireless communication module transmits each mover parameter detected and collected by the position detection module to the master computer in real time and receives a movement command issued by the upper computer.

Both the power driving module and the wireless communication module are connected to the power receiving unit. The power receiving unit supplies power to the power driving module, the position detection module, and the wireless communication module integrated with the mover.

The power driving module includes a lithium battery energy storage unit, a hardware protection unit, a central control unit, a three-phase full-bridge silicon carbide inverter unit, and a signal acquisition and adjusting unit. The hardware protection unit is connected to the power receiving unit of the power supplying module, and the hardware protection unit is connected to the central control unit after the lithium battery energy storage unit. The hardware protection unit is connected to both the three-phase full-bridge silicon carbide inverter unit and the signal acquisition and adjusting unit. The central control unit is connected to both the three-phase full-bridge silicon carbide inverter unit and the signal acquisition and adjusting unit. The position detection module is connected to the central control unit, and the wireless communication module is connected to the central control unit.

The power driving module receives the position signal transmitted by the position detection module and the movement command transmitted by the wireless communication module and thus generates three-phase PWM current to drive the mover to move.

The wireless communication module uses a 5 g communication module, transmits the position, speed, voltage, current, and other parameters of each mover to the master computer in real time, and receives the movement command issued by the master computer.

The power receiving unit of the power supplying module, the signal readhead of the position detection module, the power driving module, and the wireless communication module are integrally installed around the short primary and are fixed onto the brackets to move synchronously with the short primary.

2. A collaborative control method of the direct-drive type annular flexible transportation system is provided, and the method includes the following steps.

In step one, the movers are controlled by parallel synchronization, and the master computer sends control commands to the movers in parallel.

In step two, real-time positions $[P_1, P_2, \ldots, P_N]$ of N movers are monitored in real time according to a position signal feedback, and operating distances $[L_1, L_2, \ldots, L_N]$ among N movers are calculated according to the real-time positions $[P_1, P_2, \ldots, P_N]$, where $L_1$ represents the distance between the first mover and the second mover, $L_2$ represents the distance between the second mover and the third mover, and $L_N$ represents the distance between the $N^{th}$ mover and the first mover.

In step three, the relationship between the operating distances $[L_1, L_2, \ldots, L_N]$ among the N movers and a minimum safe operating distance Ls is compared and determined in real time, and operation data of the $k^{th}$ and $k+1^{th}$ movers when the $k^{th}$ operating distance $L_k$ is less than the minimum safe operating distance Ls is retrieved.

In step four, the deviation of actual operating speeds and position values of the $k^{th}$ and $k+1^{th}$ movers from a command value is determined according to speed and position commands. When the deviation is greater than a set threshold, it is determined that the mover has a fault, the speed and position command values are re-issued to the mover, and the power driving module adjusts the output driving current to correct the movement state.

In step five, the operation data of the faulty mover is monitored. In ten control cycles, if the operating distance from the adjacent movers is still less than the minimum safe operating distance Ls, all movers stop in an emergency, and the faulty movers sends a fault signal to the master computer.

In the disclosure, the primary excitation linear motor with high thrust density is used, the long stator has a simple structure and requires low costs, each mover can operate completely independently, and flexible transportation is thus achieved.

Compared to the related art, the beneficial effects of the disclosure include the following.

(1) In the disclosure, the primary excitation type permanent magnet linear motor is used for direct drive. Both the high-cost permanent magnet and armature are placed on one side of the armature as a short mover, while the secondary is only formed by a low-cost laminated iron core and acts as a long stator. System costs are significantly reduced in this way.

(2) In the disclosure, the permanent magnet uses an asymmetric excitation structure, which can generate a harmonic magnetomotive force with twice the number of pole pairs of higher amplitude under the same number of permanent magnets.

(3) In the disclosure, each mover has an independent power supplying module and a power driving module, and there is no electromagnetic coupling between the movers, so that the movers can operate completely independently. Flexible transportation with a high degree of freedom is thus achieved. Both the mover and stator adopt a modular structure, so it is convenient to process and manufacture, and flexible configuration may be achieved according to actual needs.

Figure 1:
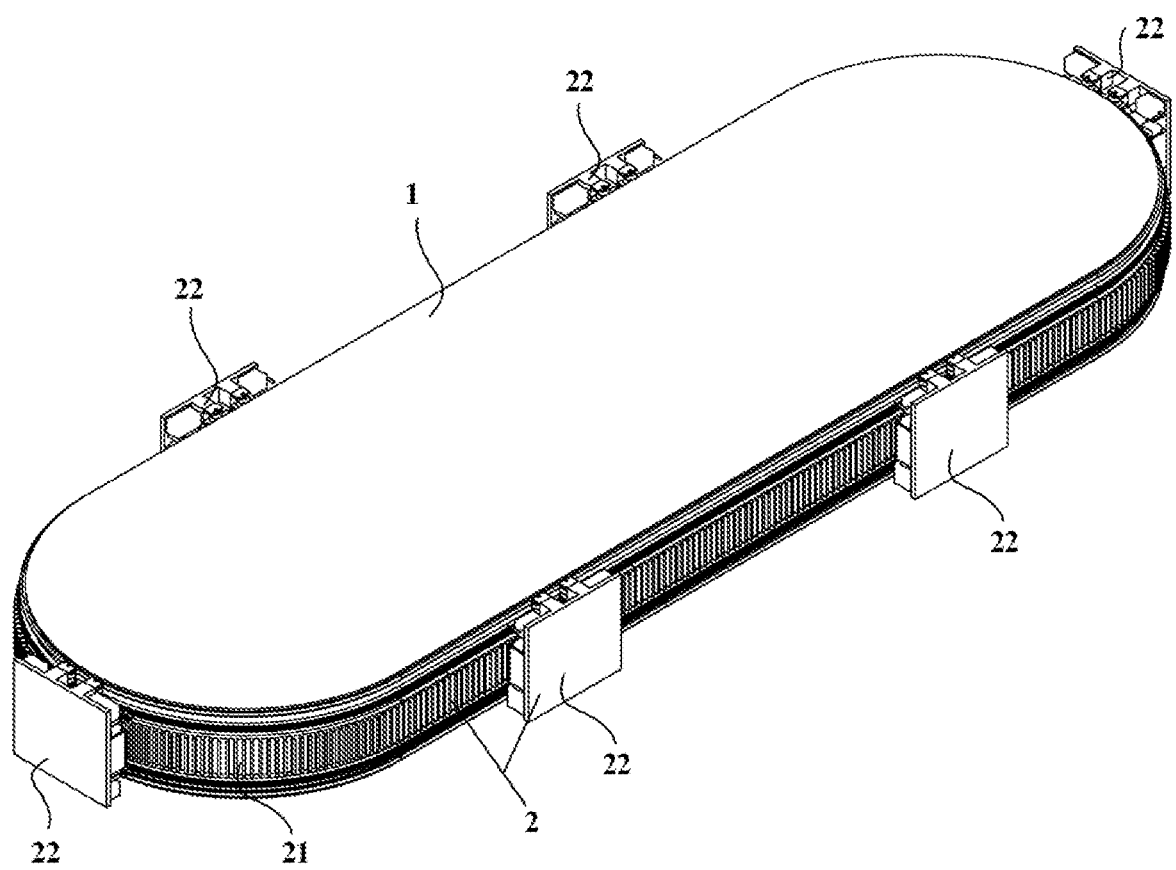
FIG. 1 is a schematic structural view of a direct-drive type annular flexible transportation system.

In the figures, an annular base 1, a primary excitation type linear motor 2, a long stator 21, a mover 22, a linear segment 21A, an arc segment 21B, a guide rail 23A, an power supplying module 24, a current collector 242, an sliding conductor line 241, a power driving module 25, a position detection module 26, a passive magnetic grid ruler 26A, a signal readhead 26B, a wireless communication module 27, a short primary 28, a permanent magnet array 281, an armature winding 282, and a primary iron core 283 are provided.

DESCRIPTION OF THE EMBODIMENTS

In order to describe the disclosure in detail, the technical solutions of the disclosure will be described in detail below with reference to the accompanying drawings and specific embodiments.

FIG. 1 is a schematic structural view of a direct-drive type annular flexible transportation system according to the embodiments of the disclosure, and the system mainly includes an annular base 1 and a primary excitation type linear motor 2. In this embodiment, the annular base 1 is made of marble, and the annular base 1 is annular and may also be constructed of aluminum profiles in practical applications. In this embodiment, the primary excitation type linear motor 2 is installed on an annular side surface of the annular base 1 and may also be installed on a horizontal surface of the annular base 1 in practical applications. The primary excitation type linear motor includes a long stator 21 and a plurality of movers 22. The movers operate independently of each other without electromagnetic coupling, and the number of movers may be increased or decreased according to actual needs. Further, for different application needs, the movers 22 may be re-developed. Surfaces of the movers may be provided with installation holes, and the installation holes on the surfaces of the movers may then be used to install different carrying apparatuses and transport items of different specifications.

Figure 2:
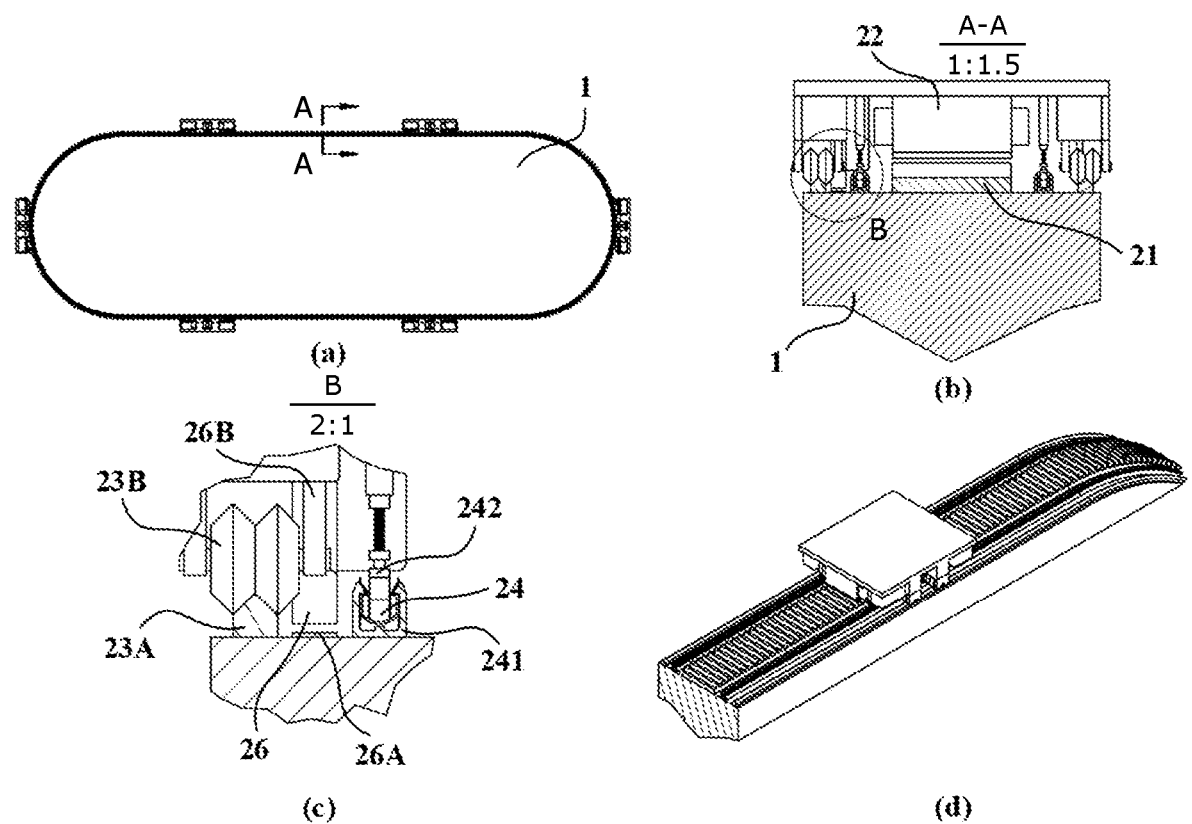
FIG. 2 is a cross-sectional view of the direct-drive type annular flexible transportation system, where (a) is a plan view of the direct-drive type annular flexible transportation system, (b) is a cross-sectional view of (a) taken along A-A, (c) is an enlarged view of the portion B of (b), and (d) is a three-dimensional view of the assembly of a long stator and a mover.
Figure 3:
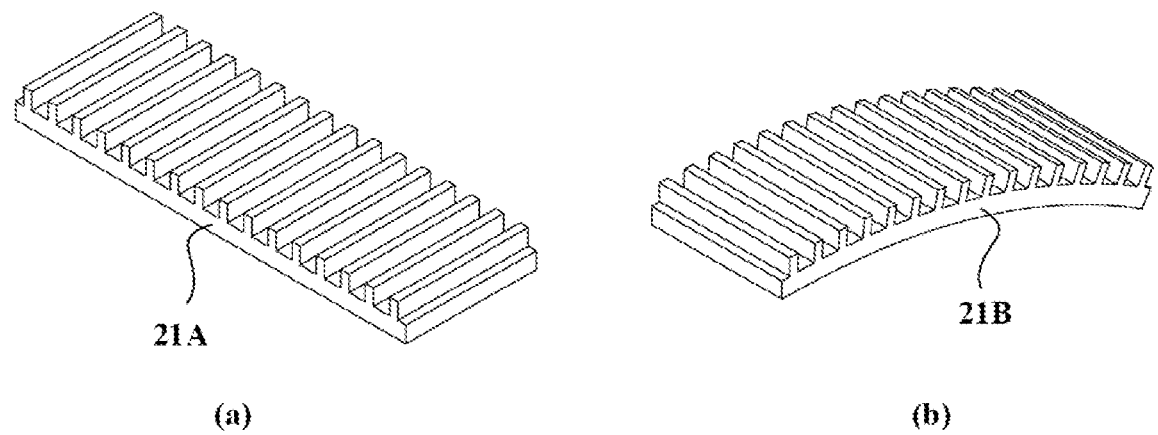
FIG. 3 is a schematic structural view of a linear segment and an arc segment of a long stator of a primary excitation type linear motor, where (a) is a schematic structural view of the linear segment of the stator, and (b) is a schematic structural view of the arc segment of the long stator.

FIG. 2 is a cross-sectional view of the direct-drive type annular flexible transportation system. The long stator 21 is fixedly connected to the annular base 1, is formed by seamless connection of stator iron cores presenting a multi-segment cogging structure, and includes a plurality of linear segments 21A and a plurality of arc segments 21B as shown in FIG. 3. The stator iron cores are provided with slots on a side surface facing the movers, the slots are arranged at intervals in a moving direction of the movers, and each slot is perpendicular to the moving direction of the movers. The moving direction of the movers is the same as that of the annular side surface of the annular base 1. A threaded hole is provided on the surface of the side surface facing away from each mover and is fixed to the annular base with a screw. The inner diameter of each stator iron core of each arc segment 21B on the side facing away from the mover is the same as the outer diameter of each arc segment on the annular side surface of the annular base 1. The mover 22 is fixed on a guide rail 23A through a roller 23B, and the guide rail 23A is laid along the long stator 21 and is fixed to the annular base 1. The mover 22 is attached onto the long stator 21 by magnetic attraction, is provided with an air gap, and moves on the guide rail through the roller. The size of the air gap between the mover and the long stator is configured to be 1 to 2 mm, and in this embodiment, the size of the air gap is 2 mm. In practical applications, considering the radius of the annular base, the length of the mover, and the installation distance of the front and rear rollers, the selection of the air gap is restricted. That is, if a smaller air gap is selected to increase the thrust density of the motor, it is necessary to ensure that the mover in the shape of a linear segment can smoothly pass through the arc segment of the stator without jamming.

An power supplying module 24 is formed by an power supplying unit and an power receiving unit, and the power supplying unit and the power receiving unit are respectively installed on the annular base 1 and each mover 22. In this embodiment, the power supplying unit is formed by two U-shaped sliding conductor lines 241. The two sliding conductor lines are arranged side by side on both sides of the long stator 21, are fixedly connected to the base, and form positive and negative power wires, and end portions thereof are connected to an external power supply source. Each mover is provided with an power receiving unit. The power receiving unit is formed by two current collectors 242 including carbon brushes, and the two current collectors 242 are arranged on both sides of a short primary 28. The current collectors 242 are slidably connected to the sliding conductor lines 241, and the current collectors 242 are elastic. It is thus ensured that the mover is reliably connected to the sliding conductor lines 241 when the mover moves in the linear segment and arc segment, and electric energy may thus be reliably transmitted to the mover 22 in real time. When the carbon brushes on the current collectors 242 are severely worn, the entire current collectors 242 may be replaced to ensure reliable connection with the sliding conductor lines 241. By means of sliding contact between the sliding conductor lines and the current collectors, the problem of cable connection when multiple movers are moving may be effectively prevented from occurring, and the costs of replacement of the current collectors are low. A position detection module 26 consists of a passive magnetic grid ruler 26A laid along the long stator and a signal readhead 26B integrated in the mover and feeds back the collected speed and position signals to the mover 22 in real time for driving control. In order to improve the positioning accuracy of the mover, the position detection module may use a grating ruler with higher accuracy.

Figure 4:
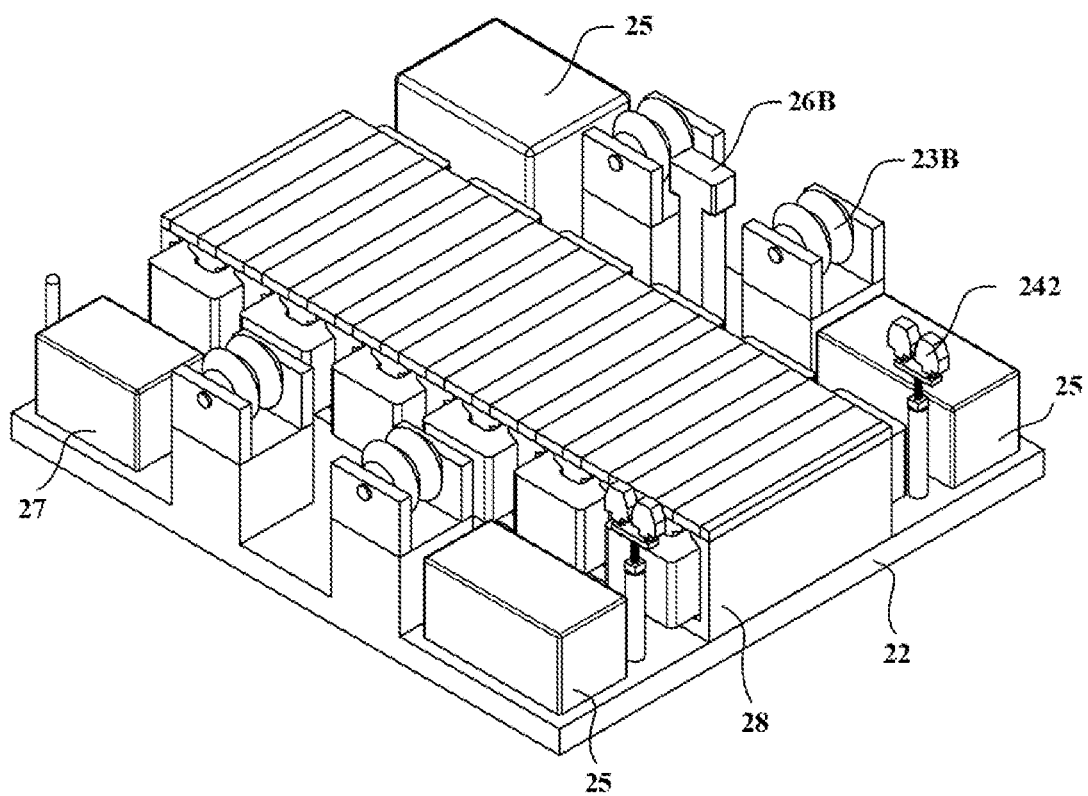
FIG. 4 is a schematic structural view of a mover of the primary excitation type linear motor.

FIG. 4 is a schematic structural view of a mover of the primary excitation type linear motor, and the main part of the mover 22 is formed by the short primary 28. Further, four rollers 23B are also installed on the mover 22 to support the mover to be fixed on the guide rail 23A and to allow air gaps to be maintained between the mover and long stator 21. A power driving module 25, a wireless communication module 27, and a master computer are also included, and the power driving module 25, the wireless communication module 27, and the mover 22 are fixedly installed together. The power receiving unit of the power supplying module 24, the signal readhead 26B of the position detection module, the power driving module 25, and the wireless communication module 27 are integrally installed around the short primary 28 and move with it.

Figure 5:
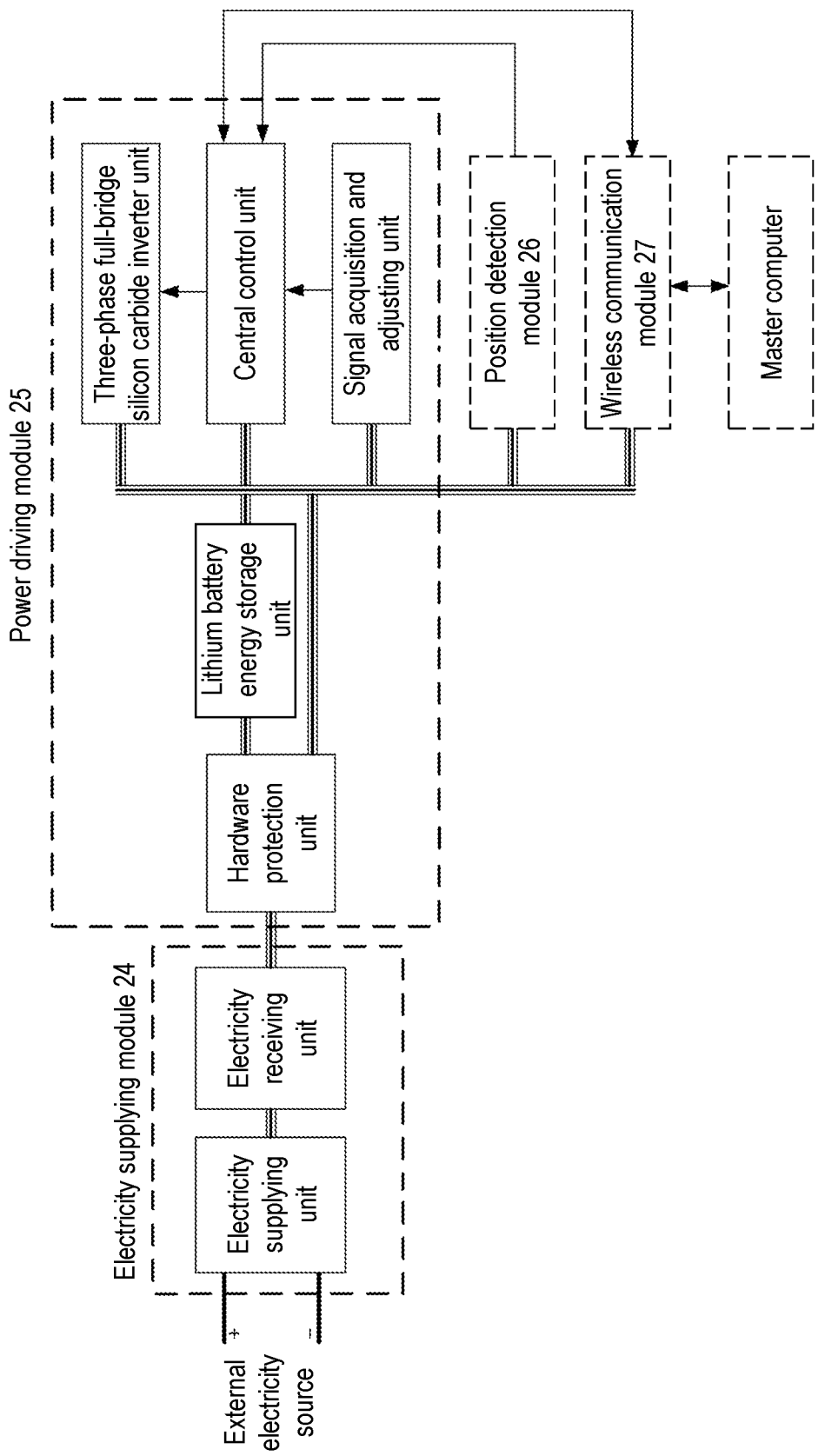
FIG. 5 is a schematic diagram of electrical and signal connection of modules of the mover.

FIG. 5 is a schematic diagram of electrical and signal connection of modules of the mover. The power driving module 25 obtains electric energy from the power receiving unit in real time and stores a part of the electric energy in a lithium battery through a lithium battery energy storage unit. A three-phase full-bridge silicon carbide inverter unit inverts and outputs the direct current obtained from the power receiving unit into three-phase alternating current, which is used to drive the mover 22 to move. When the power receiving unit fails or power is suddenly cut off, the lithium battery energy storage unit may be used to supply power to all modules on the mover 22. Besides, a hardware protection unit protects the short primary 28 from overcurrent, short circuit, and other faults. A signal acquisition and adjusting unit adjusts and feeds back the collected current, voltage, temperature, and other signals to a central control unit. The central control unit is the core of the power driving module, is responsible for receiving a position signal transmitted by the position detection module and a movement command transmitted by the wireless communication module, and thereby generates a three-phase PWM signal to the three-phase full-bridge silicon carbide inverter unit for driving the mover 22 to move. The wireless communication module 27 can transmit the parameters of each mover to the master computer in real time, receive the movement command issued by the master computer, and feed back the movement command to the power driving module 25.

Figure 6:
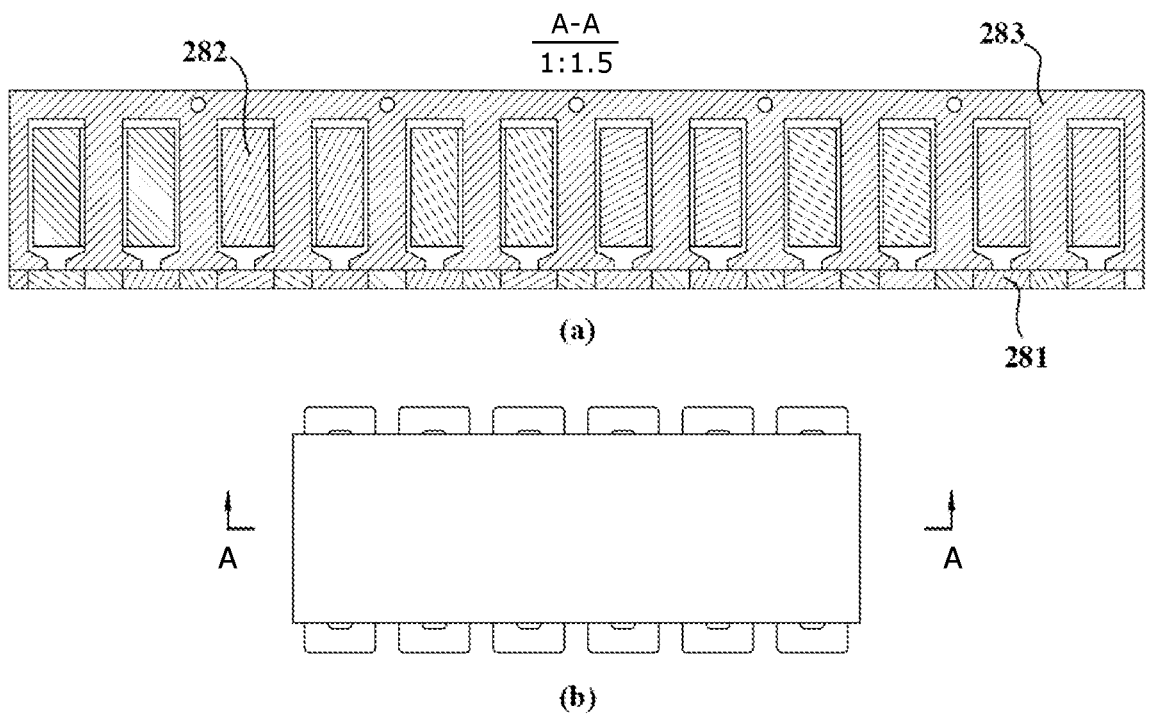
FIG. 6 is a schematic structural view of a short primary of the primary excitation type linear motor, where (a) is a cross-sectional view of the short primary taken along A-A, and (b) is a plan view of the short primary.
Figure 7:
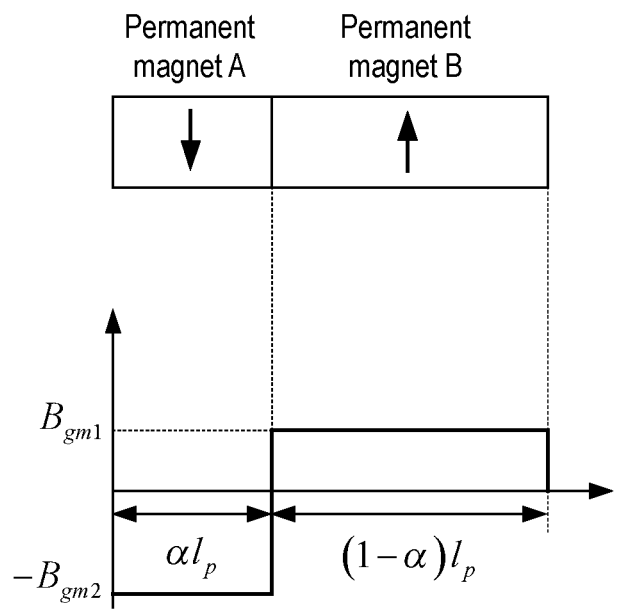
FIG. 7 is a schematic diagram of a permanent magnet unit structure and magnetic field distribution.
Figure 8:
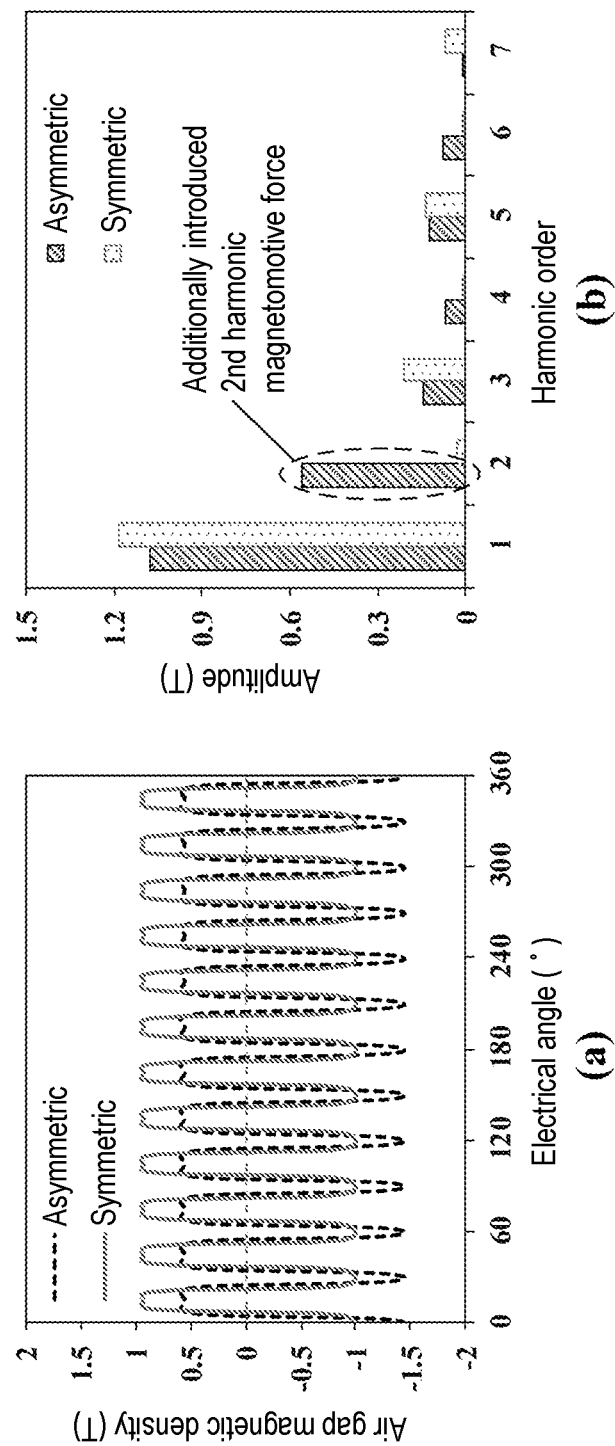
FIG. 8 is a graph comparing the air gap magnetic density waveforms and harmonic distributions under the slotless iron core of the stator, where (a) is a graph comparing the air gap magnetic density waveforms, and (b) is a graph comparing harmonic distributions.
Figure 9:
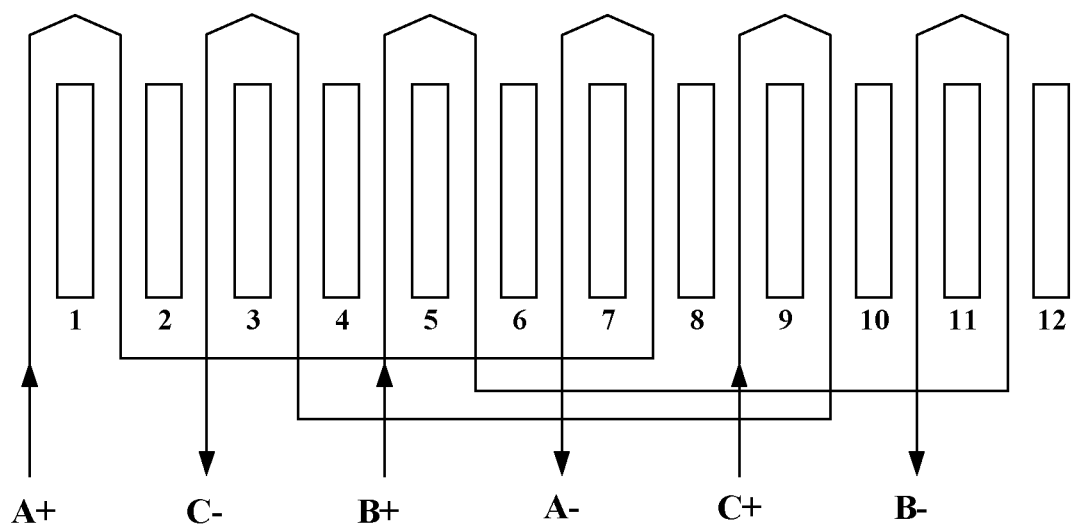
FIG. 9 is a connection diagram of an armature winding of the short primary.

FIG. 6 is a schematic structural view of the short primary 28 of the primary excitation type linear motor, and an asymmetrically-structured permanent magnet array 281, an armature winding 282, and a primary iron core 283 are included. In this embodiment, the permanent magnet array 281 is formed by Np=12 permanent magnet units closely arranged side by side and is attached to a surface of armature teeth of the primary iron core 283. Each permanent magnet unit, from left to right in one direction, is formed by a permanent magnet A and a permanent magnet B attached side by side. The permanent magnet A and the permanent magnet B have different widths and opposite polarities. FIG. 7 is a schematic diagram illustrating a permanent magnet unit structure and magnetic field distribution. It can be seen from the figure that when the permanent magnets A and B are asymmetrically distributed with different widths, the peaks of the magnetic fields of the permanent magnets A and B are not the same. Mainly, the permanent magnet with a smaller width has a higher magnetic field amplitude, while the permanent magnet with a larger width has a lower magnetic field amplitude. The positive and negative asymmetry of the amplitudes may result in additional even harmonics that can be effectively used. FIG. 7 illustrates air gap magnetic density waveforms and magnetic field distribution under a slotless iron core of the stator according to an embodiment of the disclosure. By introducing the asymmetric permanent magnet excitation structure, distribution of the permanent magnet magnetomotive force in the motor can be extended from the original symmetrical odd multiple distribution to the asymmetrical integer multiple distribution. In the case of the same number of permanent magnets, the even-numbered harmonic magnetomotive force with larger amplitude, especially the second harmonic magnetomotive force, can be additionally added and effectively used to construct a new operating mode of multi-permanent magnetomotive force co-excitation. FIG. 9 is a connection diagram illustrating an armature winding of the short primary. The armature winding 282 adopts a single-layered concentrated winding. The primary iron core 283 is wound with a coil every other armature tooth, the three-phase winding has 6 coils in total, and the difference between two adjacent coils is 60 degrees in electrical angle. The connection among the coils of each phase winding is shown in FIG. 9.

The primary iron core 283 is a laminated iron core with an integral punching type cogging structure, and a lamination direction of the laminated iron core is perpendicular to the moving direction and parallel to an installation surface of the stator iron core. The primary iron core is provided with a plurality of semi-closed slots on the side facing the long stator, and the semi-closed slots are arranged at intervals in the moving direction, and a primary iron core tooth portion is formed between two adjacent semi-closed slots. The optimal number of teeth on the stator iron core satisfies the following relationship: the optimal number of teeth on the stator iron core is 4 $N_{ph}\pm1$ when the number of slots on the primary iron core is $2N_{ph}$ ($N_{ph}$ is the number of phases), the optimal number of teeth on the stator iron core is 6 Nph±1 when the number of slots on the primary iron core is 4 $N_{ph}$, and the optimal number of teeth on the stator iron core is 8 $N_{ph}\pm1$ when the number of slots on the primary iron core is 6 $N_{ph}$. By analogy, the optimal number of teeth on the stator iron core is configured to $(kN_{ph}+2N_{ph})\pm1$, where $kN_{ph}$ represents the number of teeth on the primary iron core 283, k represents the slot number coefficient, and $N_{ph}$ is the phase number of the permanent magnet linear motor. In this embodiment, the number of phases is 3, and the number of teeth on the stator iron core is 17.

Table 1 shows the fundamental wave amplitude of the opposite electromotive force under different numbers of teeth on the stator iron core. It can be seen from Table 1 that the fundamental wave amplitude of the opposite electromotive force is the largest when the number of teeth on the stator iron core is 17, and the fundamental wave amplitude is the second largest when the number of teeth on the stator iron core is 19. When the number of teeth on the stator iron core decreases, the fundamental wave amplitude of the opposite electromotive force also decreases. When teeth on the stator iron core are 13/14 near slot-pole combination, the fundamental wave amplitude is less than the amplitude when the teeth on the stator iron core are 17/19. The main reason is that in the near slot-pole combination with a small number of teeth on the stator iron core, the second harmonic magnetomotive force cannot be efficiently used. As the number of teeth on the stator iron core increases, the fundamental wave amplitude of the opposite electromotive force decreases obviously. The main reason is that when the number of teeth on the stator iron core is large, the fundamental wave magnetomotive force cannot be efficiently used. It thus can be seen that in order to allow both the fundamental wave magnetomotive force and the second harmonic magnetomotive force to be efficiently used, the combination of the number of slots on the primary iron core and the number of teeth on the stator iron core breaks through the "near-slot combination" in the conventional symmetrical excitation. A balance of the number of teeth on the stator iron core is sought between the number of fundamental pole pairs and twice the number of harmonic pole pairs, and the optimal number satisfies the above-mentioned relationship.

TABLE 1 fundamental wave amplitude of the opposite electromotive force under different numbers of teeth on the stator iron core

| Number of teeth on stator iron core | 13 | 14 | 16 | 17 | 19 | 20 | 22 | 23 |
|---|---|---|---|---|---|---|---|---|
| Fundamental wave amplitude of opposite electromotive force (V) | 16.2 | 16.6 | 17.6 | 19.3 | 18.9 | 14.6 | 13.2 | 11.8 |

After the optimal number of teeth on the stator iron core is determined, an optimal setting method based on analytic function can be used to quickly optimize the optimal ratio of the permanent magnet width of the primary excitation type permanent magnet linear motor and the optimal ratio of the tooth width of the stator iron core. The steps are provided as follows.

In step 1, when the stator is not configured to be provided with teeth and slots, an analytical model of the slotless air-gap magnetic flux density of the asymmetric excitation poles under the slotless structure of the stator is established, which is expressed as:

$$B_{slotless}(x) = \sum_{i=1}^{\infty} \frac{4}{i\pi} \sin(\alpha i\pi) \frac{B_r}{1+g\mu_r/h_m} \cos\left[i\frac{2\pi}{l_p}x\right]$$

where x represents the distance that the short primary moves in the moving direction, $B_{slotless}(x)$ represents the slotless air-gap magnetic flux density, $\alpha$ represents the ratio of the width of the permanent magnet A to the total width of the permanent magnet unit, i represents the multiples of each sub-harmonic, g represents the air gap between the mover and the stator, $B_r$ represents the remanence of the permanent magnet, $\mu_r$ is the relative permeability of the permanent magnet, $h_m$ represents the thickness in the magnetizing direction of the permanent magnet, and $l_p$ represents the periodic slot pitch between adjacent semi-closed slots in the primary iron core.

In step 2, the air-gap magnetic flux density $B_{slotless}(x)$ when the number of pole pairs is equal to the number of teeth $N_p$ on the primary iron core is calculated as the fundamental wave amplitude. Further, the air-gap magnetic flux density $B_{slotless}(x)$ when the number of pole pairs is equal to twice the number of teeth $N_p$ on the primary iron core 11 is calculated as the second harmonic amplitude. The sum of the fundamental wave amplitude and the second harmonic amplitude is optimized to maximize, and optimization is performed to obtain the ratio $\alpha$ of the width of the permanent magnet A to the total width of the permanent magnet unit.

In step 3, under the condition that the stator is provided with teeth and slots, an analytical model of stator permeability is established, which can be expressed as:

$$\begin{cases} \Lambda_s(x,t) = \Lambda_{s0} + \Lambda_{s1}\cos\left[N_s\left(\frac{2\pi}{N_p l_p}x - V_s t - x_{s0}\right)\right] \\ \Lambda_{s0} = \frac{\mu_0}{g}\left(1 - 1.6\beta\frac{\tau - w_{st}}{\tau}\right) \\ \Lambda_{s1} = \frac{4}{\pi}\frac{\mu_0}{g}\beta\left[0.5 + \frac{\left(\frac{\tau - w_{st}}{\tau}\right)^2}{0.78125 - 2\left(\frac{\tau - w_{st}}{\tau}\right)^2}\right]\sin\left(1.6\pi\frac{\tau - w_{st}}{\tau}\right) \\ \beta = \frac{1}{2}\left(1 - 1/\sqrt{1 + \left(\frac{\tau - w_{st}}{2g}\right)^2}\right) \end{cases}$$

where t represents time, $\Lambda_s(x,t)$ represents the permeability function when the short primary moves a distance x in the moving direction at time t, $\Lambda_{s0}$ represents the $0^{th}$ order permeability value, $\Lambda_{s1}$ represents the $1^{st}$ order permeability value, $N_s$ represents the number of teeth on the stator within the same length as the short primary, $N_p$ represents the number of slots on the short primary, $V_s$ represents the moving speed of the short primary relative to the long stator, $x_{s0}$ represents the initial position of the short primary relative to the long stator, $w_{st}$ represents the tooth width of teeth on the long stator iron core, $\tau$ represents the distance between two adjacent teeth on the long stator iron core, and $\beta$ represents the coefficient of variation.

In step 4, the ratio $\alpha$ of the width of the permanent magnet A to the total width of the permanent magnet unit obtained according to step 2 is substituted into the slotless air-gap magnetic flux density analytical model of the asymmetric excitation poles under the slotless structure of the stator. Combined with the analytical model of stator permeability, the following analytical model of the air-gap magnetic flux density of the asymmetric excitation poles under the cogging structure of the stator is substituted, and the solution is carried out to obtain the air-gap magnetic flux density:

$$B_{slotted}(x, t) = B_{slotless}(x) \frac{g\Lambda_s(x, t)}{\mu_0}$$

where $B_{slotted}$ (x,t) represents the air-gap magnetic flux density of the asymmetric excitation pole with cogging structure when the short primary moves in the moving direction by a distance x at time t, and $\mu_0$ represents the vacuum permeability.

In step 5, according to the formula in step 4, the air-gap magnetic flux density under different numbers of pole pairs is calculated and summed by the fast Fourier transform. Further, the sum of the air-gap magnetic flux density is maximized, optimization is performed, the tooth width of a single stator is obtained as the optimal value, and then the optimal setting of the primary excitation type permanent magnet linear motor is completed.

Figure 10:
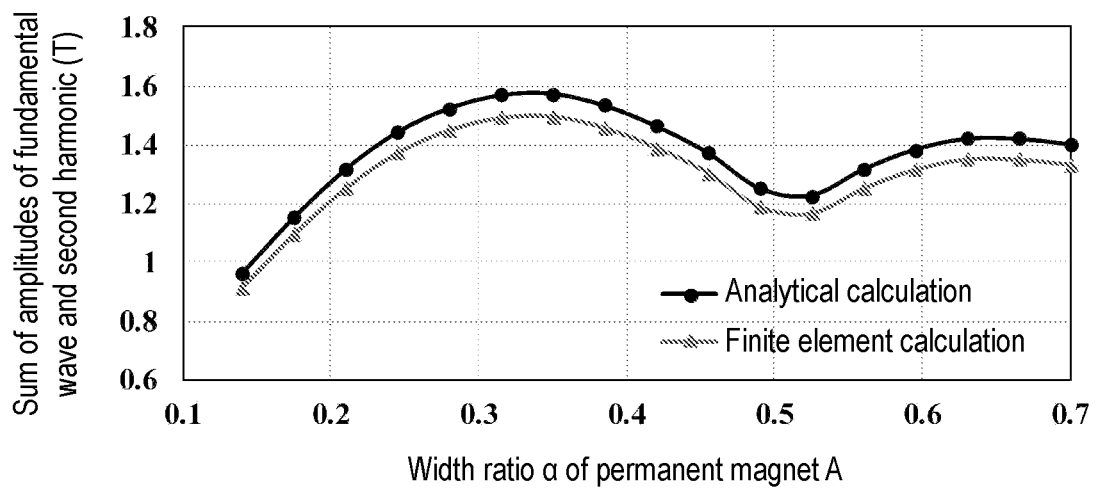
FIG. 10 is a graph of variation of the sum of amplitudes of the fundamental wave and the second harmonic with the width ratio of a permanent magnet.

FIG. 10 is a graph illustrating the variation of the sum of the amplitudes of the fundamental wave and the second harmonic with the width ratio of the permanent magnet. It can be seen from the figure that the results obtained by the fast calculation method based on the analytic function are consistent with the results based on the finite element calculation, and the specific numerical values are slightly different. Further, when the ratio α of the width of the permanent magnet A to the total width of the permanent magnet unit is approximately one-third, the sum of the amplitudes of the fundamental wave and the second harmonic is the largest, and this ratio can be set as the optimal ratio herein.

Figure 11:
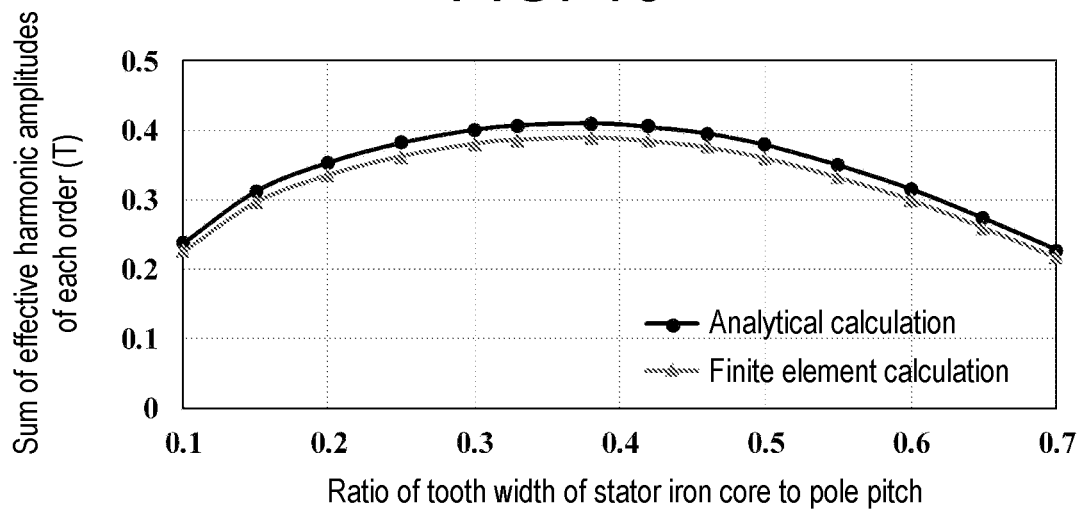
FIG. 11 is a graph of variation of the sum of the effective harmonic amplitudes of each order with the ratio of the tooth width of the stator iron core under the modulation of the stator iron core.

Based on the above, the air-gap magnetic flux density is solved by using the air-gap magnetic flux density analytical model of the asymmetric excitation magnetic pole under the cogging structure of the stator obtained in step 4. The obtained air-gap magnetic flux density is subjected to fast Fourier transform to obtain the amplitudes of air-gap magnetic flux density under different numbers of pole pairs. The magnitudes of the 2nd harmonics whose numbers of pole pairs are |12i±17|, i=1, are summed. The sum of the amplitudes of the sub-harmonics is maximized, and the optimal ratio of the tooth width of the stator iron core is optimized to obtain the optimal value. FIG. 11 is a graph illustrating the variation of the sum of the effective harmonic amplitudes of each order with the ratio of the tooth width of the stator iron core under the modulation of the stator iron core. It can be seen from the figure that the results obtained by the fast calculation method based on the analytic function are consistent with the results based on the finite element calculation, and the specific numerical values are slightly different. When the ratio of the tooth width of the stator iron core to the pole pitch of the stator is approximately one-third, the sum of the $5^{th}$, $7^{th}$ $29^{th}$, and $41^{st}$ harmonic amplitudes is the largest, and the ratio can be set as the optimal ratio herein.

Figure 12:
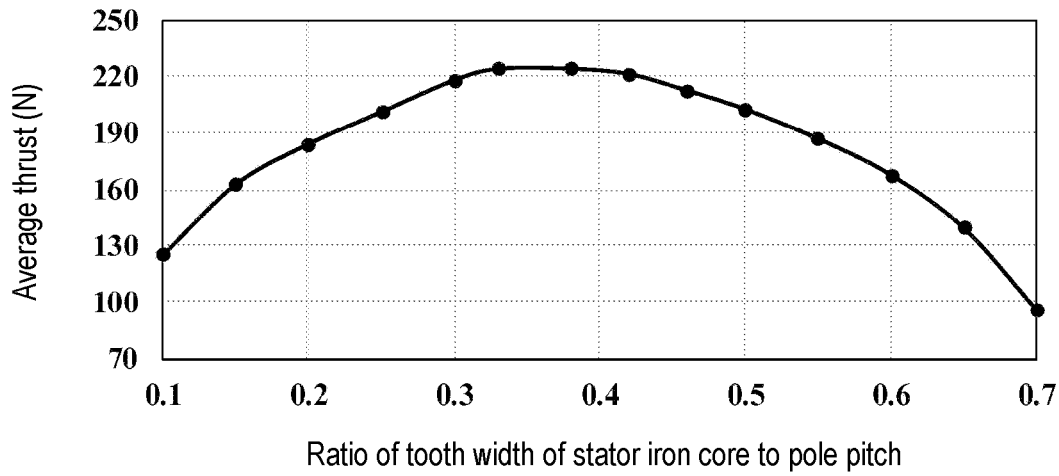
FIG. 12 is a graph of variation of the average thrust of the motor with the ratio of the tooth width of the stator iron core.

FIG. 12 is a graph illustrating the variation of the average thrust of the motor with the ratio of the tooth width of the stator iron core. It can be seen from the figure that the variation trend of the average thrust with the ratio of the tooth width of the stator iron core is consistent with the variation trend of the sum of the effective harmonic amplitudes of each order with the tooth width of the stator iron core. It can be seen that through the optimization setting method based on the analytic function, the optimal ratio of the width of the permanent magnet and the optimal ratio of the tooth width of the secondary iron core can be quickly and optimally set, so that the thrust density of the motor can be optimized and improved, and key parameters are quickly and optimally set.

Figure 13:
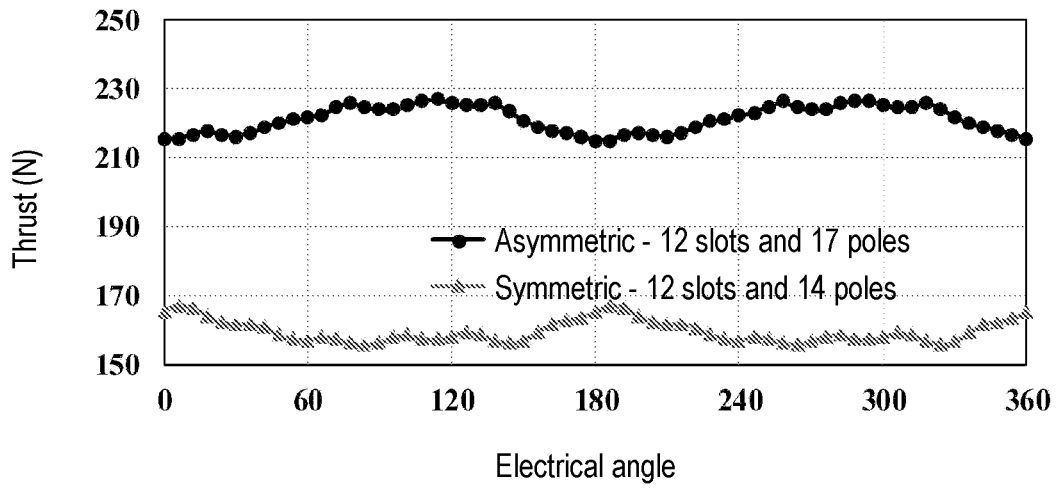
FIG. 13 is a graph comparing the average thrusts of the motor under asymmetric excitation and symmetric excitation.

FIG. 13 is a graph comparing of the average thrusts of the motor under asymmetric excitation and symmetric excitation. The optimal slot-pole combination for asymmetric excitation is 12 slots and 17 poles, and the optimal slot-pole combination for symmetrical excitation is 12 slots and 14 poles. It can be seen from the figure that under the same copper consumption and permanent magnet consumption, by changing the width ratio of the permanent magnets, the average thrust under asymmetric excitation can be increased by approximately 38.1% compared with that under symmetrical excitation. The thrust density of the motor is greatly increased. It thus can be seen that in the disclosure, the primary excitation type permanent magnet linear motor with asymmetric excitation and the optimal setting method thereof can effectively improve the thrust density of the motor.

Figure 14:
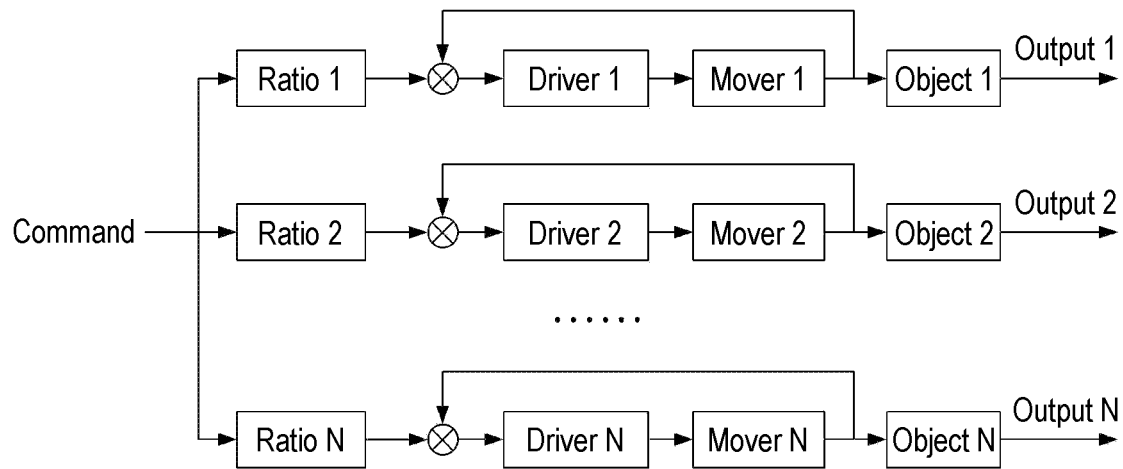
FIG. 14 is a block diagram of a collaborative control strategy among movers.

After the hardware part of the abovementioned direct-drive type annular flexible transportation system is completed, the multiple movers may be collaboratively controlled to ensure that the movers may operate independently and efficiently. FIG. 14 is a block diagram illustrating a collaborative control strategy among movers. The movers are controlled by parallel synchronization, and the master computer sends control commands to the movers in parallel. After receiving the control command, the wireless communication module transmits it to the power driving module. The central control unit of the power driving module performs feedback control according to the actual operation status of the movers and the control commands and thus generates a three-phase PWM signal to the three-phase full-bridge silicon carbide inverter unit to drive the movers to move. Parallel synchronous control can ensure that the movers maintain a certain degree of independence while operating collaboratively, and interference caused by the operation of a single mover to the operation of the entire system is also prevented from occurring.

Figure 15:
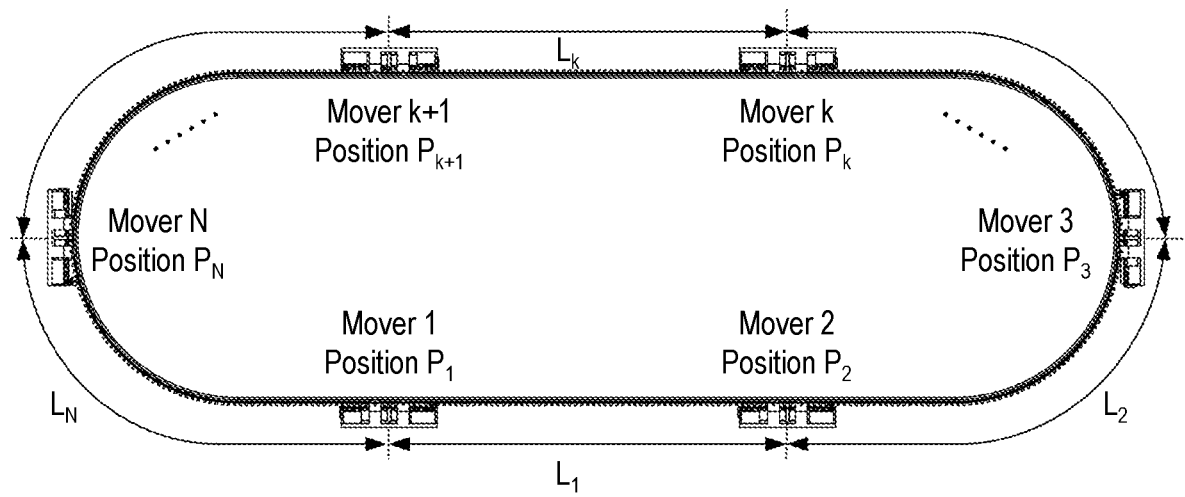
FIG. 15 is a schematic view of the operating state of the movers.

FIG. 15 is a schematic view illustrating the operating state of the movers. According to the position signal feedback, the master computer monitors the real-time positions of N movers in real time and expresses the positions as [$P_1$, $P_2$, . . . , $P_N$]. According to the real-time positions [$P_1$, $P_2$, . . . , $P_N$], the operating distances among N movers [$L_1$, $L_2$, . . . , $L_N$] can be calculated, where $L_1$ represents the distance between the first mover and the second mover, $L_2$ represents the distance between the second mover and the third mover, $L_k$ represents the distance between the $k^{th}$ mover and the k+1$^{th}$ mover, and $L_N$ represents the distance between the $N^{th}$ mover and the first mover.

Figure 16:
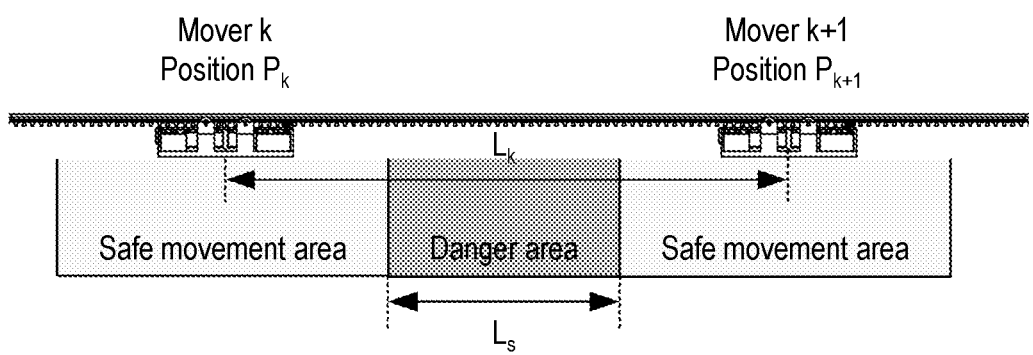
FIG. 16 is a schematic view of the minimum safe operating distance between two movers.

FIG. 16 is a schematic view illustrating the minimum safe operating distance between two movers. Under the parallel synchronous control strategy, each mover has a certain distance of safe movement area in the front and rear directions of operation, which can be used to adjust the operating state during feedback control. In the safe movement area, the movers will not collide, so the system can operate safely, and each mover adjusts its own operating state according to the control command. During the operating process, the master computer compares and determines the relationship between the operating distances [$L_1$, $L_2$, . . . , $L_N$] among the N movers and the minimum safe operating distance Ls in real time. When the $k^{th}$ operating distance $L_k$ is less than the minimum safe operating distance Ls, the $k^{th}$ and $k+1^{th}$ movers have abnormal operating states, and the operation data of the $k^{th}$ and $k+1^{th}$ movers need to be retrieved.

According to the speed and position commands, the deviation of the actual operating speeds and position values of the $k^{th}$ and $k+1^{th}$ movers from the command value is determined. When the deviation is greater than a set threshold, it is determined that the mover has a fault, the speed and position command values are re-issued to the mover, and the power driving module adjusts the output driving current to correct the movement state. The master computer continues to focus on monitoring the operation data of the faulty mover. In ten control cycles, if the operating distance from the adjacent movers is still less than the minimum safe operating distance Ls, all movers stop in an emergency, and the faulty movers sends a fault signal to the master computer.

The above description of the embodiments is for the convenience of a person having ordinary skill in the art to understand and apply the disclosure. It will be apparent to a person having ordinary skill in the art that various modifications to the abovementioned embodiments can be easily made, and the general principles described herein can be applied to other embodiments without inventive effort. Therefore, the disclosure is not limited to the abovementioned embodiments, and improvements and modifications made by a person having ordinary skill in the art according to the disclosure should all fall within the protection scope of the disclosure.

What is claimed is:

1. A direct-drive type annular flexible transportation system, comprising:
   the system comprising an annular base and a primary excitation type linear motor, wherein the primary excitation type linear motor is installed on an annular side surface of the annular base; the primary excitation type linear motor comprises a long stator and a plurality of movers, the movers operate independently of one another without electromagnetic coupling, the movers are attached onto the long stator by magnetic attraction, and air gaps are provided between the movers and the long stator,
   the long stator is fixedly connected to the annular base and is formed by seamless connection of stator iron cores presenting a multi-segment cogging structure arranged along the annular side surface of the annular base, inner surfaces of the stator iron cores are fixed on the annular side surface of the annular base, and outer surfaces of the stator iron cores are provided with slots in an annular direction of the annular base,
   each mover comprises a short primary and roller guide rail assemblies, the short primary and the roller guide rail assemblies are fixedly connected together by brackets, the short primary is located outside the long stator, an air gap is provided between the short primary and the long stator, both sides of the short primary are provided with the roller guide rail assemblies, each roller guide rail assembly comprises a roller and a guide rail, the guide rail is laid in the annular direction of the annular base, parallel to an arrangement direction of the long stator, and fixedly connected to the annular side surface of the annular base, and the roller is connected to the guide rail and moves along the guide rail,
   the short primary comprises an asymmetrically-structured permanent magnet array, armature windings, and a primary iron core, the primary iron core is provided with semi-closed slots on a side facing the long stator, a plurality of semi-closed slots are provided at intervals parallel to the arrangement direction of the long stator, armature teeth are formed between adjacent semi-closed slots, and each armature tooth is wound with a coil as the armature winding,
   the permanent magnet array is formed by permanent magnet units closely arranged side by side and is attached to a surface of the armature teethes of the primary iron core, each permanent magnet unit is composed of a permanent magnet A and a permanent magnet B arranged side by side in a fixed order in any single direction parallel to the long stator, the permanent magnet A and the permanent magnet B have opposite polarities, the width of the permanent magnet B in the arrangement direction of the long stator is greater than the width of the permanent magnet A in the arrangement direction of the long stator, forming asymmetry; one permanent magnet B is arranged at an opening of each semi-closed slot, and one permanent magnet A is arranged on an outer end surface of the armature tooth of each semi-closed slot.

2. The direct-drive type annular flexible transportation system according to claim 1, wherein:
   the stator iron cores are divided into linear segments arranged on a plane surface of the annular side surface of the annular base and arc segments arranged on an arc surface of the annular side surface of the annular base, and an arc inner diameter of the stator iron cores of the arc segments is the same as an outer diameter of the arc segments on the annular side surface of the annular base.

3. The direct-drive type annular flexible transportation system according to claim 1, wherein:
   a primary iron core uses a laminated iron core, and a lamination direction of the laminated iron core is perpendicular to a moving direction of the movers and parallel to an installation surface of the stator iron cores of the long stator.

4. The direct-drive type annular flexible transportation system according to claim 1, wherein:
   the number of the permanent magnet units is the same as the number of teeth on the primary iron core, and the number of teeth on the stator iron core of the long stator is set to $(kN_{ph}+2N_{ph})\pm 1$ within the length of a single mover, where $kN_{ph}$ represents the number of the teeth on the primary iron core, k represents a slot number coefficient, and $N_{ph}$ is a phase number of the permanent magnet linear motor.

5. The direct-drive type annular flexible transportation system according to claim 1, wherein:
   the primary excitation type linear motor further comprises an power supplying module, the power supplying module is mainly formed by an power supplying unit and an power receiving unit, and the power supplying unit and the power receiving unit are respectively installed on the annular base and the movers,
   the power supplying unit is formed by two U-shaped sliding conductor lines, each sliding conductor line is arranged in the annular direction of the annular base, arranged parallel to the arrangement direction of the long stator, and fixedly connected to the annular side surface of the annular base, the two sliding conductor lines are arranged side by side on both sides of the long stator and form a positive power wire and a negative power wire, and end portions thereof are connected to an external power supply source, the power receiving unit is formed by two current collectors comprising carbon brushes, and the two current collectors are slidably connected to the two sliding conductor lines.

6. The direct-drive type annular flexible transportation system according to claim 5, wherein:

a power receiving unit of the power supplying module, a signal readhead of a position detection module, a power driving module, and a wireless communication module are integrally installed around the short primary and are fixed onto the brackets to move synchronously with the short primary.

7. The direct-drive type annular flexible transportation system according to claim 1, wherein:

the primary excitation type linear motor further comprises a position detection module, the position detection module comprises a passive magnetic grid ruler and a signal readhead, the passive magnetic grid ruler is arranged in the annular direction of the annular base, arranged parallel to the arrangement direction of the long stator, and fixedly connected to the annular side surface of the annular base, the signal readhead is fixedly installed together with the movers, the signal readhead is located on a side of the passive magnetic grid ruler, and the signal readhead is matched with the passive magnetic grid ruler for position detection.

8. The direct-drive type annular flexible transportation system according to claim 1, wherein:

the primary excitation type linear motor further comprises a power driving module and a wireless communication module, the power driving module is fixedly installed together with the wireless communication module and the movers, the power driving module obtains electrical energy from the power receiving unit and outputs three-phase alternating current to the armature windings (282) of the short primaries in the movers to drive the movers to move; a position detection module is connected to a master computer through the wireless communication module, and the wireless communication module transmits each mover parameter detected and collected by the position detection module to the master computer in real time and receives a movement command issued by the master computer.

9. A collaborative control method applied to the direct-drive type annular flexible transportation system, the direct-drive type annular flexible transportation system comprising:

the system comprising an annular base and a primary excitation type linear motor, wherein the primary excitation type linear motor is installed on an annular side surface of the annular base; the primary excitation type linear motor comprises a long stator and a plurality of movers, the movers operate independently of one another without electromagnetic coupling, the movers are attached onto the long stator by magnetic attraction, and air gaps are provided between the movers and the long stator, the long stator is fixedly connected to the annular base and is formed by seamless connection of stator iron cores presenting a multi-segment cogging structure arranged along the annular side surface of the annular base, inner surfaces of the stator iron cores are fixed on the annular side surface of the annular base, and outer surfaces of the stator iron cores are provided with slots in an annular direction of the annular base, each mover comprises a short primary and roller guide rail assemblies, the short primary and the roller guide rail assemblies are fixedly connected together by brackets, the short primary is located outside the long stator, an air gap is provided between the short primary and the long stator, both sides of the short primary are provided with the roller guide rail assemblies, each roller guide rail assembly comprises a roller and a guide rail, the guide rail is laid in the annular direction of the annular base, parallel to an arrangement direction of the long stator, and fixedly connected to the annular side surface of the annular base, and the roller is connected to the guide rail and moves along the guide rail, the method comprising:

step one: the movers is used a parallel synchronization controlling and sending, by a master computer, control commands to each of the movers in parallel;

step two: monitoring real-time positions $[P_1, P_2, \ldots, P_N]$ of N movers in real time according to a position signal feedback and calculating operating distances $[L_1, L_2, \ldots, L_N]$ among N movers according to the real-time positions, where $L_1$ represents the distance between a first mover and a second mover, $L_2$ represents the distance between a second mover and a third mover, and $L_N$ represents the distance between a $N^{th}$ mover and the first mover;

step three: comparing and determining the relationship between the operating distances $[L_1, L_2, \ldots, L_N]$ among the N movers and a minimum safe operating distance Ls and retrieving operation data of $k^{th}$ and $k+1^{th}$ movers when a $k^{th}$ operating distance $L_k$ is less than the minimum safe operating distance Ls;

step four: determining the deviation of actual operating speeds and position values of the $k^{th}$ and $k+1^{th}$ movers from a command value according to speed and position commands, wherein when the deviation is greater than a set threshold, the mover having a fault is determined, the speed and position command values are re-issued to the mover, and the power driving module adjusts a magnitude of an output driving current to correct a movement state; and step five: monitoring the operation data of the faulty mover, wherein in ten control cycles, if the operating distance from the adjacent movers is still less than the minimum safe operating distance Ls, all of the movers stop in an emergency, and the faulty movers sends a fault signal to the master computer.

* * * * *